(12) United States Patent
Murdoch et al.

(10) Patent No.: US 12,314,801 B2
(45) Date of Patent: May 27, 2025

(54) STORAGE SYSTEM

(71) Applicant: Sato Holdings Kabushiki Kaisha, Tokyo (JP)

(72) Inventors: Graham Murdoch, St Peters (AU); George Rezk, St Peters (AU)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/019,577

(22) PCT Filed: Aug. 3, 2021

(86) PCT No.: PCT/IB2021/057074
§ 371 (c)(1),
(2) Date: Feb. 3, 2023

(87) PCT Pub. No.: WO2022/029609
PCT Pub. Date: Feb. 10, 2022

(65) Prior Publication Data
US 2023/0325616 A1  Oct. 12, 2023

(30) Foreign Application Priority Data
Aug. 4, 2020  (AU) ............... 2020902728

(51) Int. Cl.
*G06K 19/06*  (2006.01)
*A47B 47/02*  (2006.01)
(Continued)

(52) U.S. Cl.
CPC ........ *G06K 7/10336* (2013.01); *A47B 47/021* (2013.01); *G01S 5/0284* (2013.01)

(58) Field of Classification Search
CPC .......... G06K 7/10366; G06K 7/10316; G06K 7/10336; A47B 47/021; A47B 67/02; G01S 5/0284
(Continued)

(56) References Cited

U.S. PATENT DOCUMENTS

2002/0190845 A1* 12/2002 Moore ............... G06K 7/10336
340/10.3
2007/0046552 A1  3/2007 Marino
(Continued)

FOREIGN PATENT DOCUMENTS

CA  2822248 A1  6/2012
EP  2259212 A1  12/2010
(Continued)

OTHER PUBLICATIONS

International Search Report dated Nov. 9, 2021, issued in counterpart Application No. PCT/IB2021/057074. (5 pages).
(Continued)

Primary Examiner — Daniel S T Cyr
(74) Attorney, Agent, or Firm — WHDA, LLP

(57) ABSTRACT

An inventory tracking system (10) for use in tracking articles (12) received in a cabinet (14) comprises at least one RFID read antenna assembly (100), an RFID tag interrogator (30), and an electrical connector arrangement (24). The cabinet comprises a receptacle (16), a holder (18) arranged in the receptacle and at least one metal substrate (20) received in the holder. The metal substrate is configured to receive at least one article carrying an RFID tag. The RFID read antenna assembly is mountable to the metal substrate, the antenna assembly comprising at least one antenna coil (102) and a high permeability layer (104). The RFID tag interrogator is configured to interrogate the RFID tag of the, or each, article received by the at least one metal substrate.
(Continued)

The electrical connector arrangement has complementary components (26, 28) carried by the holder and the metal substrate for establishing, and breaking, an electrical connection between the interrogator and the at least read antenna assembly.

17 Claims, 5 Drawing Sheets

(51) Int. Cl.
  *G01S 5/02* (2010.01)
  *G06K 7/10* (2006.01)
(58) Field of Classification Search
  USPC .................................................. 235/492, 380
  See application file for complete search history.

(56) References Cited

U.S. PATENT DOCUMENTS

| | | | |
|---|---|---|---|
| 2008/0003083 A1* | 1/2008 | Solomon | B65G 1/127 414/237 |
| 2008/0316045 A1 | 12/2008 | Sriharto et al. | |
| 2011/0153614 A1* | 6/2011 | Solomon | B65G 1/127 707/769 |
| 2012/0137706 A1* | 6/2012 | Hussain | F28F 9/00 62/3.6 |
| 2012/0161944 A1* | 6/2012 | Chen | G06K 17/00 340/10.6 |
| 2014/0085052 A1 | 3/2014 | Singh et al. | |
| 2014/0291397 A1* | 10/2014 | Caputo | G16H 15/00 235/385 |
| 2016/0253860 A1* | 9/2016 | Wilson | G07F 11/06 221/258 |

FOREIGN PATENT DOCUMENTS

| | | |
|---|---|---|
| JP | 2008-19020 A | 1/2008 |
| JP | 2008-61003 A | 3/2008 |
| JP | 2009-230512 A | 10/2009 |
| JP | 2013-056772 A | 3/2013 |
| JP | 2020-45216 A | 3/2020 |
| WO | 2009/003231 A1 | 1/2009 |

OTHER PUBLICATIONS

Office Action dated Jul. 24, 2023, issued in counterpart AU Application No. 2021322788. (4 pages).
Office Action dated Nov. 2, 2023, issued in counterpart IN application No. 202317005950, with English Translation. (6 pages).
Office Action dated Jan. 9, 2024, issued in counterpart JP application No. 2023-507963, with English translation. (17 pages).

* cited by examiner

STORAGE SYSTEM

TECHNICAL FIELD

The present disclosure relates, generally, to an inventory tracking system, and, more particularly, to an inventory tracking system for use in tracking and/or locating articles carrying RFID tags. The disclosure has particular, but not necessarily exhaustive, application to an inventory tracking system for use in tracking and/or locating articles received in a cabinet and carrying RFID tags.

BACKGROUND

Tracking and/or locating inventory allows for accurate stocktake to be performed and for inventory to be located and retrieved quickly. RFID tag interrogation is a convenient method for tracking and locating inventory, since it does not require users to come into contact with the inventory and can be performed rapidly. Certain types of inventory, such as medical inventory, is stored on metal substrates within an incubator or a cabinet.

It will be appreciated that, in this specification, reference to "tracking" is to be understood as including, where appropriate, locating of suitably tagged articles within a receptacle.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

In an aspect of the present disclosure, there is provided an inventory tracking system for use in tracking articles received in a cabinet, the cabinet comprising a receptacle, a holder arranged in the receptacle and at least one metal substrate displaceably received in the holder, the at least one metal substrate being configured to receive at least one article carrying an RFID tag, the system comprising: at least one RFID read antenna assembly mountable to the at least one metal substrate, the at least one antenna assembly comprising at least one antenna coil and a high permeability layer; an RFID tag interrogator configured to interrogate the RFID tag of the, or each, article received by the at least one metal substrate; and an electrical connector arrangement having complementary components carried by the holder and the at least one metal substrate for establishing, and breaking, an electrical connection between the interrogator and the at least read antenna assembly when the at least one metal substrate is inserted into, and removed from, the holder respectively.

The holder of the cabinet may comprise a frame arranged within the cabinet and a plurality of metal substrates, each in the form of a tray, with the trays being arranged in spaced, removable, stacked relationship in the frame and each tray defining a plurality of discrete compartments in each of which an article carrying an RFID tag is receivable. The system may comprise an RFID read antenna assembly associated with each compartment of each tray with the electrical connector arrangement being associated with each tray to facilitate interrogation of the RFID tag of each article in the cabinet by the RFID tag interrogator.

Each compartment may be elongate defining a longitudinal axis and each antenna assembly may be correspondingly elongate with a longitudinal axis of each read antenna being coaxial with the longitudinal axis of the associated compartment such that the RFID tag of the article associated with that compartment and the at least one antenna coil of the antenna assembly are functionally aligned for the RFID tag to be interrogated by the interrogator via the antenna assembly of the compartment.

The at least one antenna coil of each antenna assembly may terminate in a set of terminal contacts, the set of terminal contacts of each antenna assembly being connected to a set of conductors carried by the tray with which that antenna assembly is associated. The set of conductors may be carried on a conductor carrier mounted to the tray.

The conductor carrier may electrically connect the tray to the holder via a connector unit, with a first component of the connector unit being mounted to the tray and a second component of the connector unit being mounted to the holder. The second component of the connector unit may connect to a second set of conductors carried on the holder.

One of the first and second components of the connector unit may comprise a set of fixed contacts and the other of the first and second components of the connector unit may comprise a set of resiliently displaceable contacts which is driven into electrical contact with the set of fixed contacts when the tray is driven home fully relative to the holder. The system may include a retention mechanism associated with each tray and the holder for assisting in retaining the tray in its fully home position relative to the holder to maximise electrical connection between the set of fixed contacts and the set of resiliently displaceable contacts of the connector unit. Each tray may be of a ferromagnetic material and the retention mechanism may rely on the magnetism of each tray and a magnet carried by the holder.

The system may comprise a locator mechanism associated with each compartment of each tray and the antenna assembly associated with that compartment for locating the antenna assembly in a fixed position relative to its associated compartment. Each tray may be foraminous and the locator mechanism may comprise a plurality of apertures defined in each compartment of each tray and at least one locator carried by the high permeability layer of each antenna assembly, the at least one locator of each antenna assembly being received in at least one of the apertures defined in the associated compartment to mount and locate the antenna assembly in its compartment in the tray.

The at least one antenna coil of the, or each, antenna assembly may be carried on an elongate carrier mounted to the high permeability layer. The at least one antenna coil may have a plurality of transversely arranged portions with at least some of the transversely arranged portions being spaced from one another relative to the longitudinal axis.

The system may comprise a second high permeability layer associated with each antenna assembly, each second high permeability layer being mountable to an operatively lower surface of an upper metal substrate of the plurality of metal substrates such that each second high permeability layer is functionally aligned with its associated antenna assembly, arranged on an operatively upper surface of a subjacent metal substrate of the plurality of metal substrates, for providing a further low reluctance path for a magnetic field emanating from the antenna assembly.

In a non-limiting embodiment, each antenna assembly may be mountable to an operatively lower surface of an upper metal substrate of the plurality of metal substrates. The system may further comprise at least one second high permeability layer mountable to an operatively upper surface of a subjacent metal substrate of the plurality of metal substrates such that each second high permeability layer is functionally aligned with its associated antenna assembly for providing a further low reluctance path for a magnetic field emanating from the antenna assembly.

The disclosure extends to an incubator cabinet which comprises a receptacle; a holder displaceably arranged in the receptacle; at least one metal substrate displaceably received in the holder, the at least one metal substrate defining at least one compartment configured to receive an article carrying an RFID tag; and an inventory tracking system, as described above, mounted to the cabinet with the at least one RFID reader antenna assembly being associated with the at least one compartment of the metal substrate.

The disclosure extends further to a component for an incubator cabinet, the component comprising a metal substrate; and at least one RFID read antenna assembly of an inventory tracking system, as described above, releasably carried by the metal substrate.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Non-limiting embodiments of the disclosure will now be described by way of example only with reference to the accompany drawings in which.

DETAILED DESCRIPTION OF NON-LIMITING EMBODIMENTS

Figure 1:
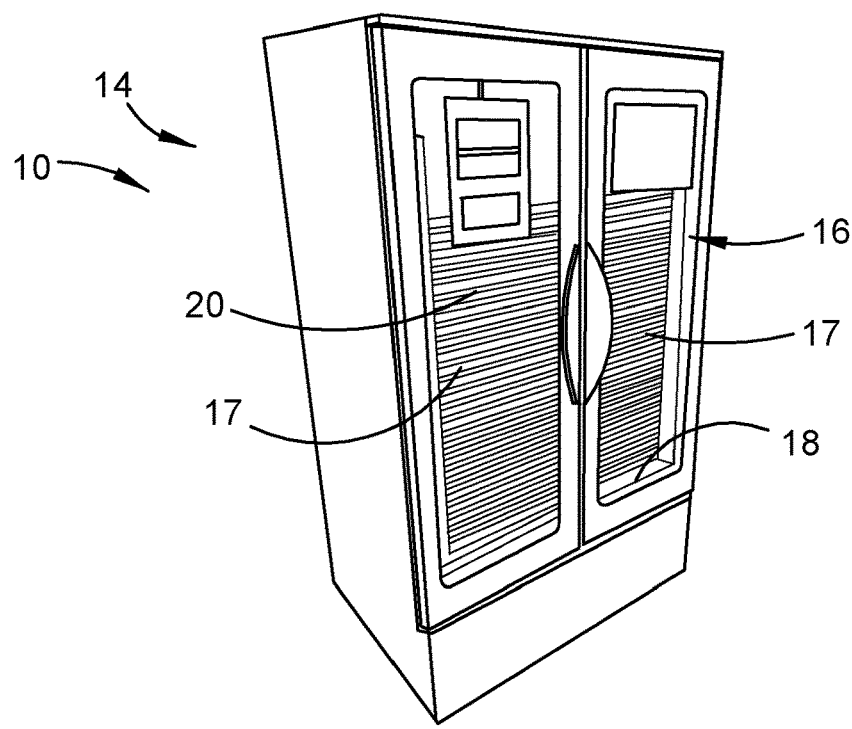
FIG. 1 shows a perspective view of a cabinet including a receptacle, a holder in the form of a frame arranged in the receptacle and metal substrates each in the form of a tray, removably received in the frame.
Figure 6:
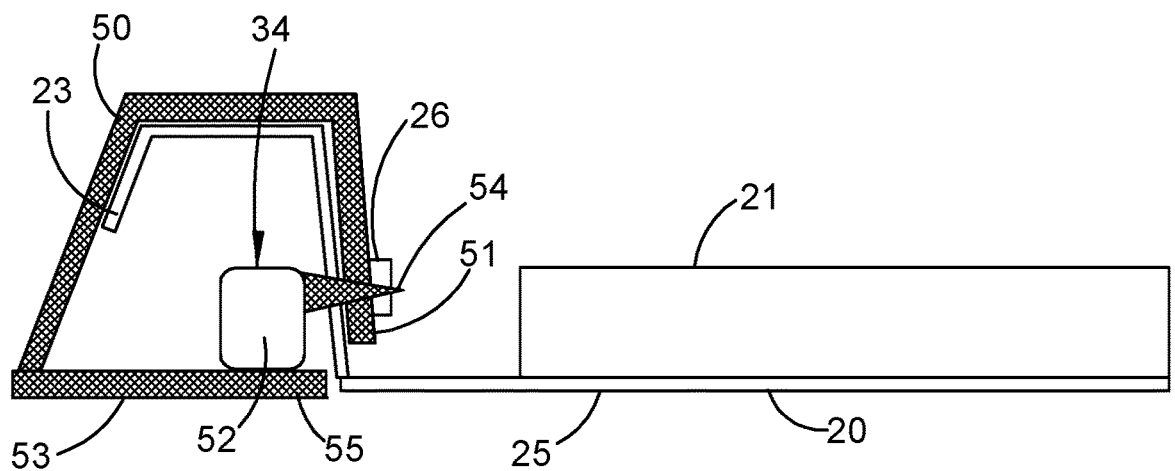
FIG. 6 shows a schematic, side view of a component of a connector unit of the inventory tracking system, mounted to a modified tray of the cabinet shown in FIG. 1.
Figure 7:
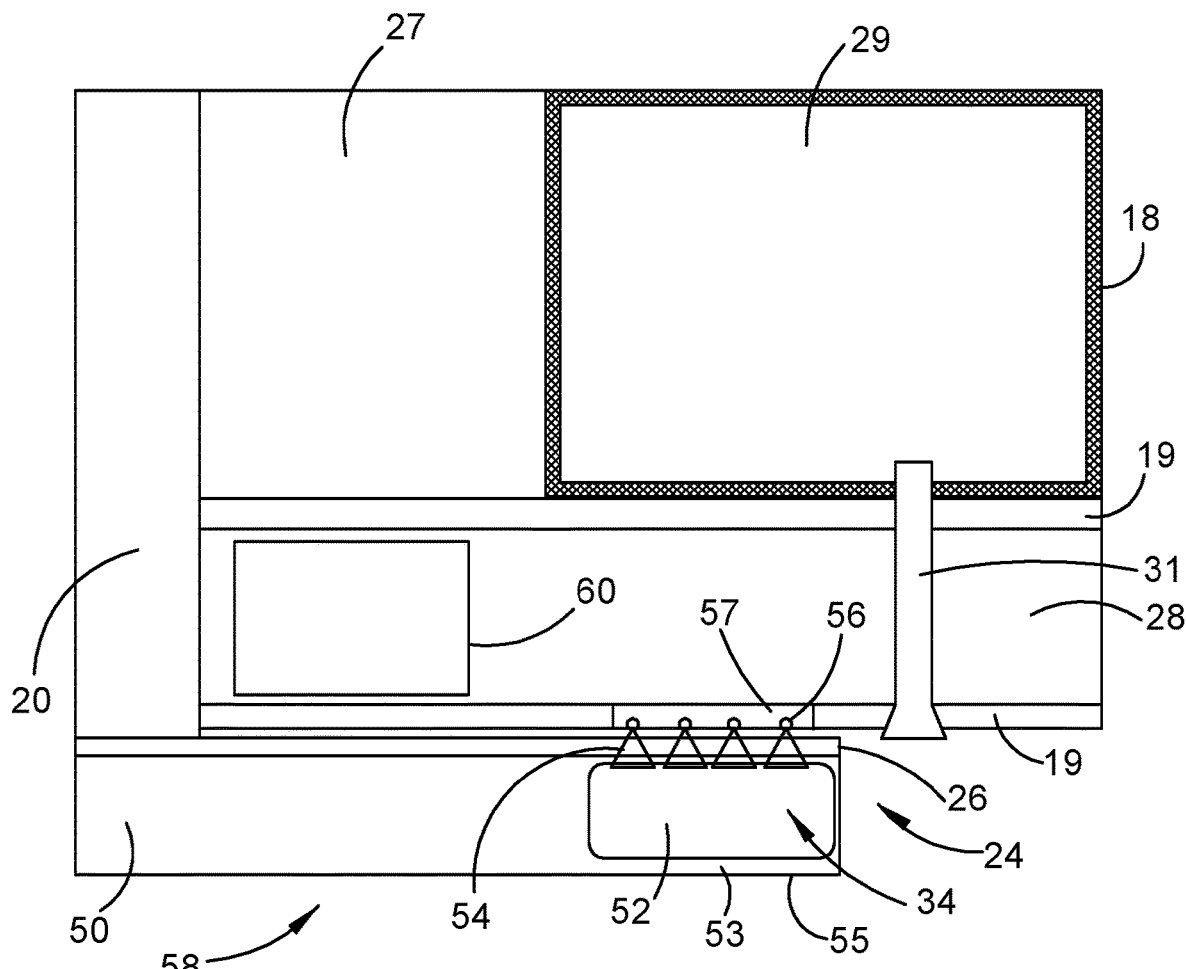
FIG. 7 shows a schematic, plan, sectional view of a part of the modified tray with the component of the connector unit shown in FIG. 6 connected with another component of the connector unit.

In the drawings, reference numeral 10 generally designates an inventory tracking system for use in tracking articles 12 received in a cabinet 14. As shown in FIG. 1, the cabinet 14 includes a receptacle 16, a holder in the form of a frame 18 arranged in the receptacle 16, and doors 17. Each operatively vertical portion of the frame 18 comprises a guide block 27 of a synthetic plastics material and a support stanchion 29 (FIG. 7). The cabinet 14 also includes metal substrates, each in the form of a tray 20. Each tray 20 comprises a handle 23 and a base 25 (FIGS. 6-7). The trays 20 are displaceably and, more particularly, removably, received in the frame 18 and arranged in a spaced, operatively vertically stacked relationship in the frame 18.

The non-limiting embodiment of the cabinet 14 shown in FIG. 1 is an incubator for articles 12, for example the cabinet may be an agitator. Each article 12 may be in the form of a flexible, generally plastics, bag containing bodily fluids, such as blood or blood components, for example, platelets. The contents of each bag needs to be agitated and, as such, the frame 18 is mounted within the receptacle 16 of the cabinet in a reciprocatory manner to be reciprocated relative to the receptacle 16 to effect agitation of the bags 12.

It will be appreciated by a person skilled in the art that there may only be a single tray 20 removably received in the frame 18, that there may only be a single article 12 received on the tray 20, and that the cabinet 14 may be any general cabinet with trays 20.

Figure 2:
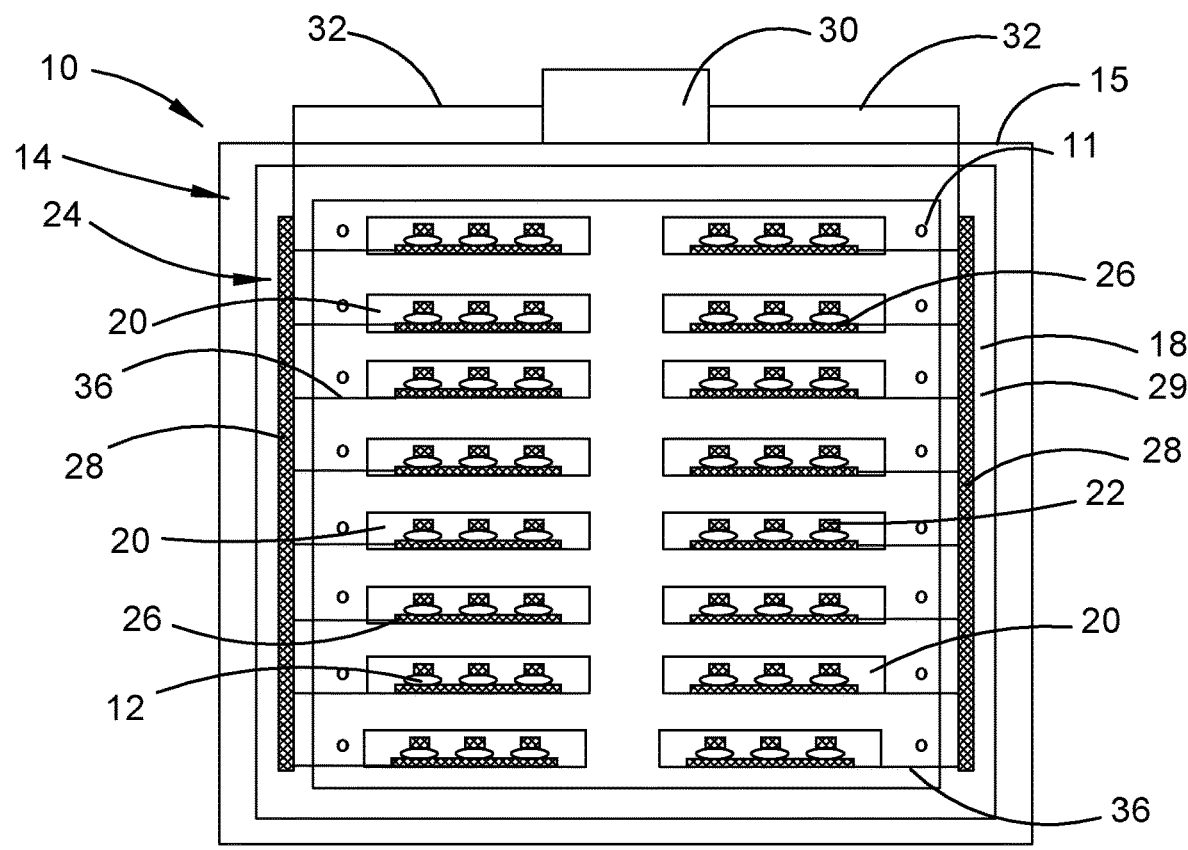
FIG. 2 shows a schematic, front view of a non-limiting embodiment of an inventory tracking system for use in tracking articles received on the trays of the cabinet shown in FIG. 1.

In the schematic representation of the inventory tracking system 10 shown in FIG. 2, each tray 20 is configured to receive a plurality of the bags 12, each bag 12 carrying an RFID tag 22, in operatively horizontally spaced relationship. Typically, an RFID tag may include an RFID chip and an antenna coil. The inventory tracking system 10 includes an electrical connector arrangement 24 having complementary components in the form of conductor carriers 26, 28, carried by the trays 20 and the frame 18, respectively. Each conductor carrier 26, 28 is in the form of a printed circuit board (PCB) as will be described in greater detail below.

One PCB 26 is mounted to each tray 20 and carries a set of conductors (not shown) in the form of tracks of the PCB 26. One PCB 28 is mounted to each support stanchion 29 of the frame 18 and carries a second set of conductors (not shown), also in the form of tracks of the PCB 28. In this non-limiting embodiment, each PCB 28 is disposed between two plastics covers 19, with the PCB 28 and the plastics covers 19 being mounted to the support stanchion 29 via a fastener 31 (FIG. 7). PCB 26 and PCB 28 are connected via electrical connection 36.

The inventory tracking system 10 also includes an RFID tag interrogator 30 to which each of the PCBs 28 is connected, as represented schematically by electrical connection 32 as shown in FIG. 2. The RFID tag interrogator is configured to interrogate the RFID tag 22 of each bag 12. The RFID tag interrogator 30 is connected to a computer (not shown) either via a wired or a wireless connection. As indicated above, a PCB 26 is associated with each tray 20 to facilitate interrogation of the RFID tag 22 of each bag 12 on each tray 20 in the cabinet 14 by the RFID tag interrogator 30. Each PCB 26 is connected to one of the PCBs 28 via a connector unit 34 (FIGS. 6-7).

Figure 3:
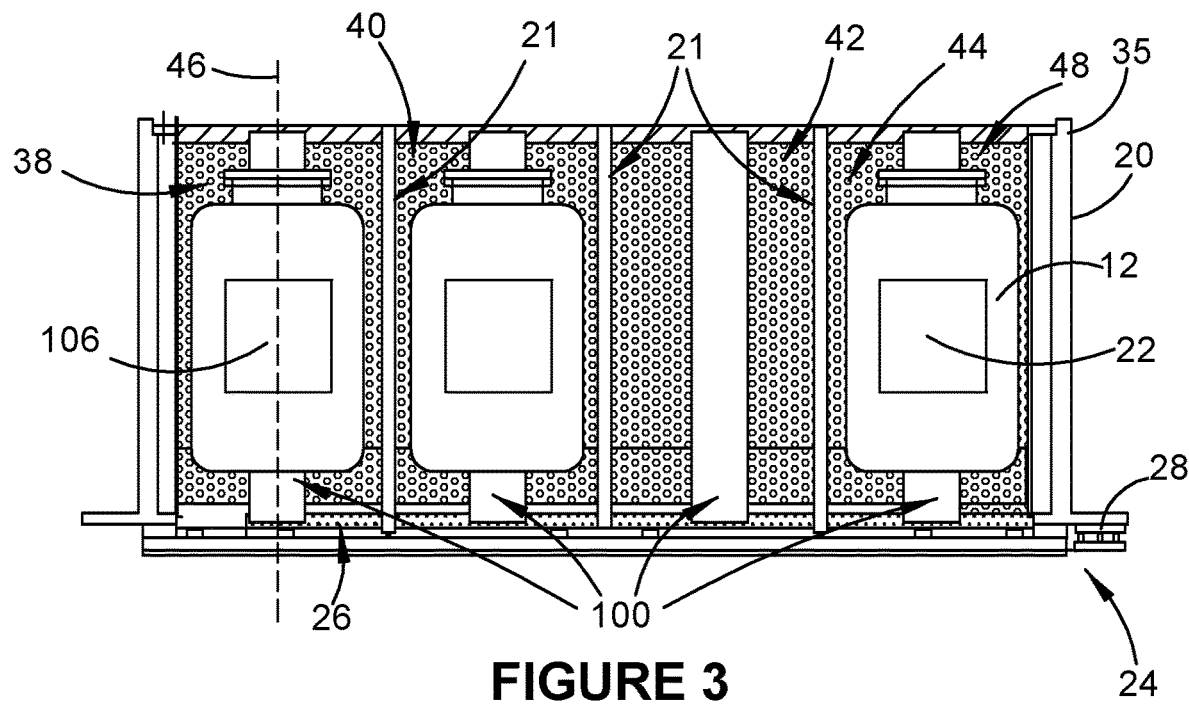
FIG. 3 shows a plan view of one of the trays of the system shown in FIG. 2, in use, with four RFID read antenna assemblies of the inventory tracking system being mounted to the tray, and with four articles being received on the tray, each article being associated with one of the antenna assemblies.

FIG. 3 shows a non-limiting embodiment of one of the trays 20 of the cabinet 14. The tray 20 carries a plurality of laterally arranged dividers 21 defining a plurality of discrete compartments 38, 40, 42, 44 in each of which one of the bags 12, carrying the RFID tag 22, is received.

Figure 8A:
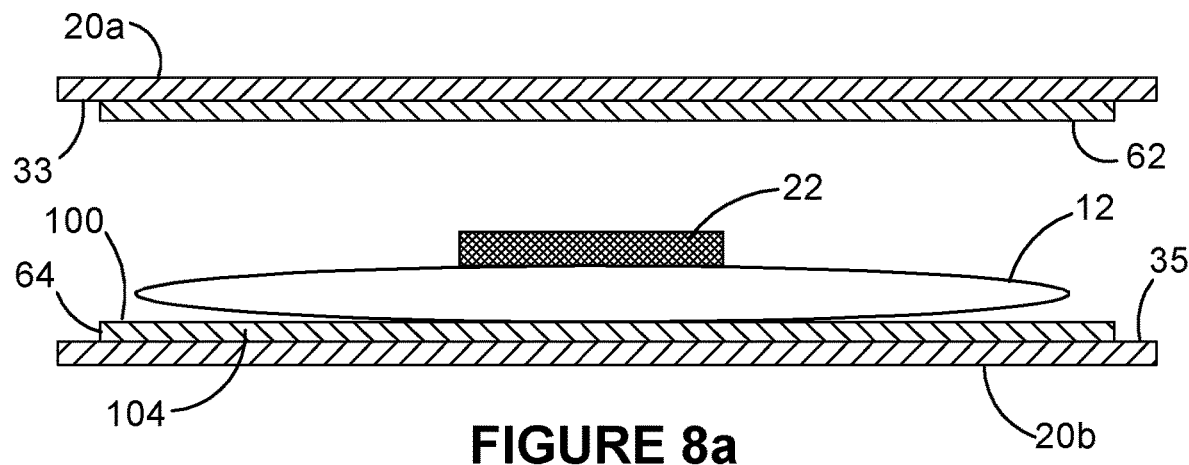
FIG. 8a shows a sectional side view of one non-limiting embodiment of a part of the inventory tracking system mounted on one of the trays of the cabinet, in use, with an article carrying an RFID tag being received on the tray.

The inventory tracking system 10 also includes a plurality of RFID read antenna assemblies 100 with an antenna assembly 100 being associated with each compartment 38, 40, 42, 44 of each tray 20 of the cabinet 14. Each antenna assembly 100 includes an antenna coil 102, a cover (not shown) and a high permeability layer in the form of a ferrite layer 104. The antenna coil 102 of each antenna assembly 100 terminates in a pair of contacts 110, 112 via which the antenna assembly 100 connects to one of the PCBs 26. Further, each antenna assembly 100 is mounted to the tray 20, with the ferrite layer 104, in this non-limiting embodiment (and also as shown in FIG. 8a), being disposed on an operatively upper surface 35 of the tray 20. Each bag 12 rests on its associated antenna assembly 100, in use, though the entire antenna assembly 100 is shown for illustrative purposes in FIG. 3. The connector unit 34 is also shown, though is illustrated in more detail in FIGS. 6-7.

Each of the compartments 38, 40, 42, 44 is elongate and defines a longitudinal axis 46, and each antenna assembly 100 is correspondingly elongate, defining a longitudinal axis 106. When the antenna assembly 100 is mounted in its associated compartment 38, 40, 42, 44, the longitudinal axis 106 of the antenna assembly 100 lies coaxially with the longitudinal axis 46 of its associated compartment 38, 40, 42, 44. In this way, the RFID tag 22 of the bag 12 associated with that compartment 38, 40, 42, 44 and the antenna coil 102 of the antenna assembly 100 are functionally aligned to facilitate interrogation of the RFID tag 22 by the RFID tag interrogator 30 via the antenna assembly 100 of the compartment 38, 40, 42, 44.

Figure 5A:
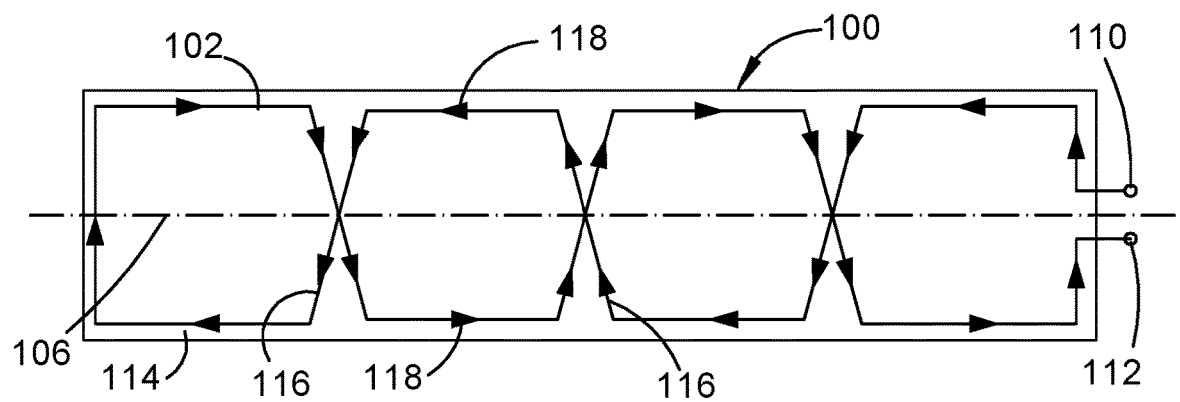
FIG. 5a shows a non-limiting embodiment of an antenna coil of one of the RFID read antenna assemblies shown in FIG. 3.

FIG. 5a shows a non-limiting embodiment of the antenna coil 102, which terminates in the pair of contacts 110, 112. The antenna coil 102 is carried on an elongate carrier 114 mounted to the ferrite layer 104. The non-limiting embodiment of the antenna coil 102 shown in FIG. 5a has a plurality of transversely arranged portions 116 with some of the transversely arranged portions 116 being spaced from one another relative to the longitudinal axis 106. The antenna coil 102 is configured to be driven by the RFID tag interrogator 30 to carry a current in the direction shown by arrows 118 for interrogating the RFID tag 22.

As described above, each bag 12, in use, carries blood platelets and it is important that the platelets be agitated while stored in the cabinet 14. If the antenna assembly 100 were too thick, a step may be formed on each side of the antenna assembly 100 and the surface 35 of the associated tray 20. The bag 12 may overlie such a step and create a damming effect of the platelets at the step which is undesirable. Thus, in the case of each antenna assembly 100, the ferrite layer 104, the elongate carrier 114, and the cover has a thickness of less than 1 mm, preferably about 0.1-0.5 mm, and, as an example, about 0.2 mm thick to reduce the size of the step and minimise damming of the platelets in the bag 12. It will be appreciated that the configuration of the antenna assembly 100 shown in FIG. 5a is one non-limiting embodiment and that there are many other possible configurations for such a strip antenna, including configurations with a plurality of antenna coils.

It will be appreciated that there are multiple arrangements of the antenna assembly 100 within the frame 18 as a part of the inventory tracking system 10, which will provide an equivalent technical effect.

Figure 4:
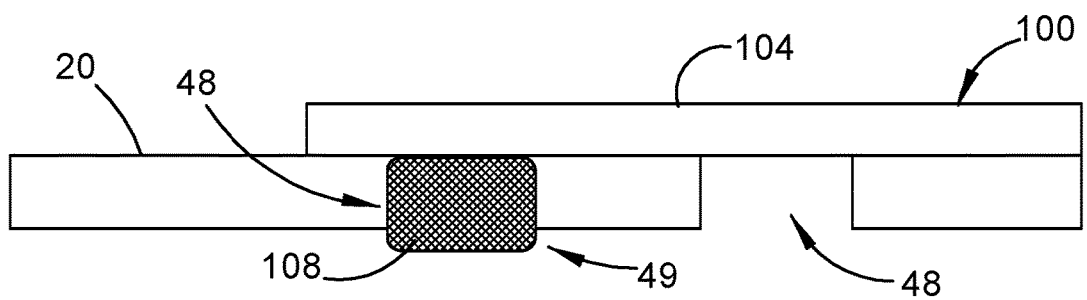
FIG. 4 shows a partial, schematic side view of one of the RFID read antenna assemblies mounted to the tray shown in FIG. 3.

In the illustrated non-limiting embodiment, the tray 20 is foraminous, defining a plurality of apertures 48 as shown in FIG. 4. At least one of the apertures 48 of the tray 20 forms a part of a locator mechanism 49. The antenna assembly 100 includes a second part of the locator mechanism 49, in the form of a locator pin 108, carried on an operatively bottom surface of the ferrite layer 104. The locator pin 108 is removably received in the aperture 48 to mount and locate the antenna assembly 100 in its compartment 38, 40, 42, 44 of the tray 20. The locator pin 108 is retained in the aperture 48 via a press fit. It will be appreciated that each antenna assembly 100 may comprise a plurality of locator pins 108, each locator pin 108 being received in one of the plurality of apertures 48 of the tray 20.

Figure 5B:
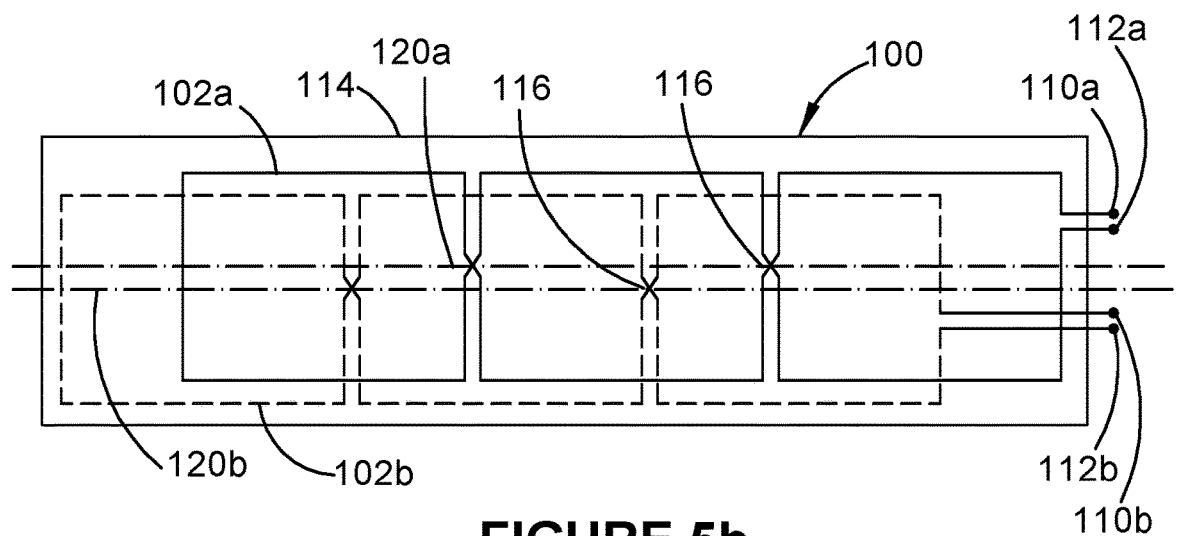
FIG. 5b shows a schematic, top view of another non-limiting embodiment of an antenna assembly for use with the tray of the system shown in FIG. 3.

FIG. 5b shows a second embodiment of the antenna assembly 100, with two antenna coils 102a, 102b arranged in a longitudinally staggered relationship on the elongate carrier 114. With reference to previous embodiments, like reference numerals refer to like parts, unless otherwise specified. The antenna coil 102b is illustrated in dashed lines to clearly differentiate each antenna coil 102a, 102b. In addition, the two antenna coils 102a, 102b are shown with their longitudinal axes 120a, 120b offset from each other, the axes 120a, 120b being in register with the longitudinal axis 106 of the elongate carrier 114. However, this is for illustrative purposes only and, in practice, the longitudinal axes 120a, 120b of the two antenna coils 102a, 102b, respectively, will be coaxial with each other. The pairs of transversely arranged portions 116 of each antenna coil 102a, 102b are longitudinally spaced from each other. It will be understood that the transversely arranged portions 116 of each antenna coil 102a, 102b are arranged in a similar manner as described above with reference to FIG. 5a.

The antenna coils 102a, 102b have the same configuration as each other, which, in this embodiment, is two pairs of transversely arranged portions 116, forming a sequence of three antenna loops. The antenna coils 102a, 102b each terminate in a pair of contacts 110a, 112a, 110b, 112b. The antenna coils 102a, 102b each communicate with, and are configured to be driven by, the RFID tag interrogator 30 via the pairs of contacts 110a, 112a, 110b, 112b and the connector arrangement 24 to interrogate the RFID tag 22 associated with the bag 12.

The antenna coils 102a, 102b are configured to be driven sequentially with respect to each other. Alternatively, the antenna coils 102a, 102b are configured to be driven out of phase with each other and, more particularly, the antenna coils 102a, 102b are configured to be driven 90° out of phase with each other. It will be understood by the person skilled in the art that there may be more than two antenna coils carried by the elongate carrier 114 in order to provide more spaced pairs of transversely arranged portions 116 in which case, where the antenna coils are driven out of phase with each other, the phase difference between the driving current of the antenna coils will differ correspondingly.

In the non-limiting embodiment shown in FIG. 8a, each antenna assembly 100 has a second high permeability layer, in the form of a second ferrite layer, 62 associated with it. Each second high permeability layer 62 is mounted to an operatively lower surface 33 of a superjacent tray 20a by press fitting at least one locator pin (not shown) into one of the plurality of apertures 48 via the operatively lower surface 33 of the tray 20a. The second ferrite layer 62 is functionally aligned with the antenna assembly 100 mounted to the surface 35 of the subjacent tray 20b in the manner shown in FIG. 4. The second ferrite layer 62 provides a low reluctance path for a magnetic field emanating from the antenna assembly 100, thereby enhancing mutual inductance between the antenna assembly 100 and the RFID tag 22 carried by the bag 12.

Figure 8B:
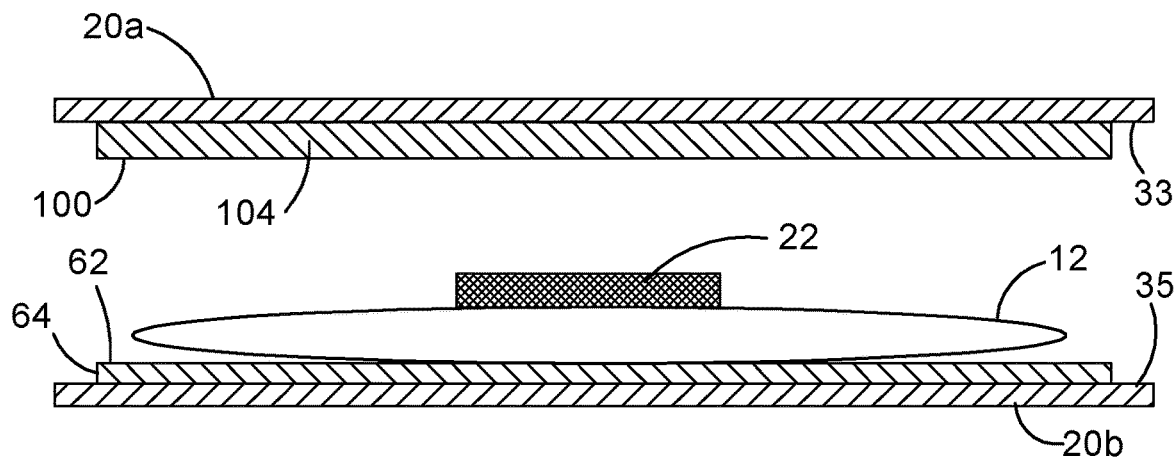
FIG. 8b shows a sectional side view of another non-limiting embodiment of a part of the inventory tracking system mounted on one of the trays of the cabinet, in use, with an article carrying an RFID tag being received on the tray.

As described above, it is required that each antenna assembly 100 be made as thin as possible. This can result in manufacturing complexity and there is a risk of damage to the antenna assembly 100 when it is cleaned or removed from its associated tray 20. FIG. 8b shows another non-limiting embodiment of the system 10. With reference to the previous drawings, like reference numerals refer to like parts, unless otherwise specified.

In this non-limiting embodiment, each antenna assembly 100 is mounted to the superjacent tray 20a by press fitting the locator pin 108 into one of the plurality of apertures 48 via the operatively lower surface 33 of the tray 20a (in a similar manner as shown in FIG. 4). In this non-limiting embodiment, each antenna assembly 100, once again, has a second ferrite layer 62 associated with it. Each second ferrite layer 62 is mounted to the subjacent tray 20b by press fitting at least one locator pin (not shown) into one of the plurality of apertures 48 via the operatively upper surface 35 of the subjacent tray 20b to functionally align with its associated antenna assembly 100. The second ferrite layer 62 serves to provide a low reluctance path for a magnetic field emanating from the antenna assembly 100, thereby enhancing mutual inductance between the antenna assembly 100 and the RFID tag 22 carried by the bag 12. The second ferrite layer 62 is thin, being of the order of less than 1 mm thick and, for example, about 0.2 mm thick, thereby reducing the step and potential damming effect of the bag 12 overlying the ferrite layer 62.

This arrangement is advantageous due to obviating the need for the antenna assembly 100 to be as thin as possible and can, instead, be manufactured using, firstly, a thicker ferrite layer 104 and, secondly, a thicker antenna coil 102. This non-limiting embodiment has the further advantage that the thicker ferrite layer 104 further strengthens the magnetic field enhancing RFID operation between the antenna assembly 100 and the RFID tag 22 carried by the bag 12. The thicker antenna coil 102 is up to about 3.5 mm thick, for example, approximately 1.6 mm thick. The thicker ferrite layer 104 is up to about 2.5 mm thick, for example, between approximately 0.5 mm to 1 mm thick, and, typically, about 0.5 mm thick.

In alternative embodiments, a single ferrite layer may be used under the antenna. In such embodiments, a locator pin and second ferrite layer 62 are not required.

A tray 20 with the PCB 26 is shown in more detail in FIGS. 6 and 7. In a non-limiting embodiment, an original handle 23 of each tray 20 of an existing cabinet 14 has been modified by mounting a bracket 50 to the handle 23 for housing a first component of the connector unit 34. The first component of the connector unit 34 is in the form of a terminal block 52. Resiliently displaceable contacts in the form of spring-biased pins 54 are carried by, and project from, the terminal block 52. The terminal block 52 and the pins 54 are mounted to a base 53 of a portion 55 of the bracket 50 extending laterally from a side of the tray 20. The PCB 26 is carried on an operatively inner surface of the base 53 of the bracket 50. The pins 54 of the terminal block 52 are connected to tracks of the PCB 26.

In a non-limiting embodiment, the frame 18 of an existing cabinet 14 is modified by mounting one of the second PCBs 28 to each support stanchion 29 of the frame 18. Each second PCB 28 carries a second component of the connector unit 34, the second component being in the form of a contact carrier 57 which carries a set of fixed contacts 56, there being a complementary number of fixed contacts 56 to the number of pins 54 of the terminal block 52. In this way, the connector unit 34 is in the form of spring loaded contacts 54, 56 for electrically connecting the antenna assemblies 100 of the tray 20 to the RFID tag interrogator 30 carried at the top of the frame 18. It will be appreciated that the connector unit 34 may have other configurations, such as the pins 54 being connected to the second PCB 28 and the contacts 56 being connected to the PCB 26.

In order to form a connection between each antenna assembly 100 and the RFID tag interrogator 30, the pins 54 are driven into electrical contact with the contacts 56 when the relevant tray 20 is inserted into the frame 18 into a fully home position 58 relative to the frame 18.

To assist in retaining the tray 20 in its fully home position 58, the inventory tracking system 10 includes a retention mechanism associated with each tray 20 and the frame 18. In this non-limiting embodiment, the retention mechanism is in the form of a magnet 60 associated with, and carried by, the PCB 28. The tray 20 is of a ferromagnetic material, with the retention mechanism relying on the magnetism of each tray 20 and the magnets 60. By retaining the tray 20 in the fully home position 58, the electrical connection between the contacts 56 and the pins 54 of the connector unit 34 is maximised. It will be appreciated that, instead of a magnet, other form of retention mechanisms such as, for example, latches, or the like, could be used to retain the tray 20 in its fully home position relative to the frame 18.

In use, a technician may modify each existing tray 20 of an existing cabinet 14 by mounting the bracket 50 to each tray 20 using, for example, a frictional engagement or other forms of fasteners (not shown). The terminal block 52 is mounted to the bracket 50 extending laterally from the side of the tray 20, using, for example, a suitable adhesive.

The PCB 26 of each tray 20 is mounted to the bracket 50 using, for example, a suitable adhesive. Each antenna assembly 100 is connected to its associated PCB 26 by, for example, soldering the terminal contacts 110, 112 of the antenna assembly 100 to the relevant tracks of the PCB 26.

The locator 108 of the antenna assembly 100 is press fit into the aperture 48 of the tray 20 to mount the antenna assembly 100 in its associated compartment 38, 40, 42, 44 of the tray 20. In some non-limiting embodiments, the technician may also install the dividers 21 to define the compartments 38, 40, 42, 44 of each tray 20 by, for example, press fitting locators (not shown) of each of the dividers 21 into corresponding apertures 48 of the tray 20.

Each second PCB 28 is placed between the two plastic covers 19 and mounted to the frame 18 by the technician, using, for example, the fastener 31, a suitable adhesive or another form of fastener. Each second PCB 28 carries one set of contacts 56 and one magnet 60 per tray 20 of the cabinet 14. The PCBs 28 are connected to the RFID tag interrogator 30, which, for example and as described above, is disposed at an operatively top region 15 of the frame 18 and the RFID tag interrogator 30 is connected to the computer. It will be appreciated that the technician may vary the thickness of each plastics cover 19 to achieve the desired retention effect between each magnet 60 and each tray 20 e.g., a thicker plastics cover 19 will dampen the magnetic field from each magnet 60 reaching each tray 20.

Once the inventory tracking system 10 has been installed in the cabinet 14, the user places one bag 12 in each compartment of the tray 20, with each bag 12 having an RFID tag 22 associated with it. The tray 20 is moved to the fully home position 58, such that the pins 54 and the contacts 56 of the associated connector unit 34 form the electrical connection, with the magnets 60 assisting in retaining each tray 20 in its fully home position 58.

To interrogate the RFID tag 22 of each article 12, the user drives the antenna assemblies 100 of each tray 20 via the RFID tag interrogator 30 and the electrical connector arrangement 24.

Advantageously, the inventory tracking system 10 may be installed without requiring any substantial re-tooling of the cabinet 14, due to the electrical connector arrangement 24 providing a means for connecting the antenna assemblies 100 to the RFID tag interrogator 30 via the existing trays 20 and the existing frame 18. The electrical connector arrangement 24 also allows for the doors 17 to be kept closed, in use, to retain the required environmental conditions in the interior of the cabinet 14. The ability to track inventory using the inventory tracking system 10 allows for fast and accurate stocktake to be performed and for inventory to be located and retrieved quickly without requiring the user to come into contact with the inventory.

In the exemplary application, the trays 20 are utilised in incubators where temperature must be controlled, since metal is an efficient heat conductor. Therefore, forming the trays 20 from plastic is not ideal. Advantageously, the inventory tracking system 10 allows inventory to be tracked on the trays 20 via the antenna assemblies 100 with increased signal strength.

Further, the trays 20 within the incubator are foraminous and include the apertures 48 to allow for ventilation. The locator 108 received in the aperture 48 reduces relative movement of the antenna assembly 100 and the RFID tag 22 of the bag 12 as the frame 18 is reciprocated relative to the cabinet 14, thereby assisting in maintaining signal strength.

In addition, the RFID tag 22 is applied to its associated bag as part of a label adhesively attached to an operatively outer surface of the bag 12. As the label could be applied anywhere on the outer surface of the bag 12, the RFID tag 22 may not optimally align with the antenna assembly 100 of the compartment of the tray 20 into which the bag 12 is placed. The use of an elongate, strip antenna assembly 100 assists in minimising misalignment of the RFID tag 22 and the antenna assembly 100. Also, as it is required to pass temperature controlling fluid around the bag 12, the use of an elongate, strip antenna assembly 100 minimises the number of apertures 48 occluded by the antenna assembly 100, thereby allowing ventilation of the bag 12 to occur.

It will be appreciated that the cabinet 14 may be initially manufactured including the inventory tracking system 10 as part of the original equipment, rather than being modified by a technician to include the inventory tracking system 10.

In some embodiments, each tray 20 (or a group of trays, for example a row of trays) is associated with an indicator 11 configured to indicate status parameters associated with the tray 20. In one example embodiment each tray includes a light panel or light indicator such as a light emitting diode (LED), for example a two-colour LED.

In some example embodiments, the LED can have one colour and is used to indicate that the tray 20 is properly pushed home ensuring good electrical contact between PCB 26 and PCB 28. If contact is not made then the LED does not light up. In other example embodiments, the LED can be configured to display a coded message, for example the LED may be programmed to flash to indicate fill status of the tray 20. Flashing could mean, for example, that there are some empty positions on the tray 20 so that the user can see immediately where to place platelet bags 12 on a tray 20 with space (for example in empty compartment 42 as illustrated in FIG. 3).

In yet further example embodiments, a two-colour LED may be used and programmed to indicate various messages as required. For example, a combination of colour combinations, flashing combinations, or the like may indicate one or more of the tray 20 being properly pushed home (or not), fill status, trays requiring special attention, etc.

The LED indicator 11 allows the user to interact with the cabinet 14 without needing any computer interface (for example). With this simplified interface a user can simply observe the LED colour or code, and thereby know that the tray 20 is properly pushed in, which trays have room for further bags 12, and which trays need special attention.

It is noted that the foregoing has outlined some of the more pertinent non-limiting embodiments. It will be clear to those skilled in the art that modifications to the disclosed non-limiting embodiments can be effected without departing from the scope thereof. As such, the described non-limiting embodiments ought to be considered as merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiments being expressly contemplated herein so that a person of ordinary skill in the art would appreciate from this disclosure that features, elements and/or functions of one embodiment may be incorporated into another embodiment, as those skilled in the art would appreciate from this disclosure that features, elements and/or functions of one embodiment may be incorporated into another embodiment as appropriate, unless described otherwise, above. Although the description is made for particular arrangements and methods, the intent and concept thereof may be suitable for and applicable to other arrangements and applications.

The invention claimed is:

1. An inventory tracking system for use in tracking articles received in a cabinet, the cabinet comprising a receptacle, a holder arranged in the receptacle and at least one metal substrate displaceably received in the holder, the at least one metal substrate being configured to receive at least one article carrying an RFID tag, the system comprising:
   at least one RFID read antenna assembly mountable to the at least one metal substrate, the at least one RFID read antenna assembly comprising at least one antenna coil and a high permeability layer;
   an RFID tag interrogator configured to interrogate the RFID tag of the, or each, article received by the at least one metal substrate; and
   an electrical connector arrangement having a first component carried by the holder, and a second, complementary components carried by the at least one metal substrate for establishing, and breaking, an electrical connection between the interrogator and the at least one RFID read antenna assembly when the at least one metal substrate is inserted into the holder, and removed from the holder thereby providing access to the at least one article, respectively.

2. The system of claim 1 in which the holder of the cabinet comprises a frame arranged within the cabinet and a plurality of metal substrates, each in the form of a tray, with the trays being arranged in spaced, removable, stacked relationship in the frame and each tray defining a plurality of discrete compartments in each of which an article carrying an RFID tag is receivable and in which the system comprises an RFID read antenna assembly associated with each compartment of each tray with the electrical connector arrangement being associated with each tray to facilitate interrogation of the RFID tag of each article in the cabinet by the RFID tag interrogator.

3. The system of claim 2, in which each compartment is elongate defining a longitudinal axis and in which each antenna assembly is correspondingly elongate with a longitudinal axis of each read antenna being coaxial with the longitudinal axis of the associated compartment such that the RFID tag of the article associated with that compartment and the at least one antenna coil of the antenna assembly are functionally aligned for the RFID tag to be interrogated by the interrogator via the antenna assembly of the compartment.

4. The system of claim 2 in which the at least one antenna coil of each antenna assembly terminates in a set of terminal contacts, the set of terminal contacts of each antenna assembly being connected to a set of conductors carried by the tray with which that antenna assembly is associated.

5. The system of claim 4 in which the set of conductors is carried on a conductor carrier mounted to the tray.

6. The system of claim 5 in which the conductor carrier electrically connects the tray to the holder via a connector unit, with a first component of the connector unit being mounted to the tray and a second component of the connector unit being mounted to the holder.

7. The system of claim 6 in which the second component of the connector unit connects to a second set of conductors carried on the holder.

8. The system of claim 6 in which one of the first and second components of the connector unit comprises a set of fixed contacts and the other of the first and second components of the connector unit comprises a set of resiliently displaceable contacts which is driven into electrical contact with the set of fixed contacts when the tray is driven home fully relative to the holder.

9. The system of claim 8 which includes a retention mechanism associated with each tray and the holder for assisting in retaining the tray in its fully home position relative to the holder to maximise electrical connection between the set of fixed contacts and the set of resiliently displaceable contacts of the connector unit.

10. The system of claim 9 in which each tray is of a ferromagnetic material and in which the retention mechanism relies on the magnetism of each tray and a magnet carried by the holder.

11. The system of claim 2, which comprises a locator mechanism associated with each compartment of each tray and the antenna assembly associated with that compartment for locating the antenna assembly in a fixed position relative to its associated compartment.

12. The system of claim 11 in which each tray is foraminous and the locator mechanism comprises a plurality of apertures defined in each compartment of each tray and at least one locator carried by the high permeability layer of each antenna assembly, the at least one locator of each antenna assembly being received in at least one of the apertures defined in the associated compartment to mount and locate the antenna assembly in its compartment in the tray.

13. The system of claim 2, further comprising a second high permeability layer associated with each antenna assembly, each second high permeability layer being mountable to an operatively lower surface of an upper metal substrate of the plurality of metal substrates such that each second high permeability layer is functionally aligned with its associated antenna assembly, arranged on an operatively upper surface of a subjacent metal substrate of the plurality of metal substrates, for providing a further low reluctance path for a magnetic field emanating from the antenna assembly.

14. The system of claim 2, in which each antenna assembly is mountable to an operatively lower surface of an upper metal substrate of the plurality of metal substrates.

15. The system of claim 14, further comprising at least one second high permeability layer mountable to an operatively upper surface of a subjacent metal substrate of the plurality of metal substrates such that each second high permeability layer is functionally aligned with its associated antenna assembly for providing a further low reluctance path for a magnetic field emanating from the antenna assembly.

16. The system of claim 1, wherein the at least one antenna coil of the, or each, antenna assembly is carried on an elongate carrier mounted to the high permeability layer; and the at least one antenna coil has a plurality of transversely arranged portions with at least some of the transversely arranged portions being spaced from one another relative to the longitudinal axis.

17. An incubator cabinet which comprises
a receptacle;
a holder displaceably arranged in the receptacle;
at least one metal substrate displaceably received in the holder, the at least one metal substrate defining at least one compartment configured to receive an article carrying an RFID tag; and
an inventory tracking system mounted to the cabinet with the at least one RFID reader antenna assembly being associated with the at least one compartment of the metal substrate, wherein the inventory tracking system comprises:
at least one RFID read antenna assembly mountable to the at least one metal substrate, the at least one RFID read antenna assembly comprising at least one antenna coil and a high permeability layer;
an RFID tag interrogator configured to interrogate the RFID tag of the article received by the at least one metal substrate; and
an electrical connector arrangement having a first component carried by the holder, and a second, complementary component carried by the at least one metal substrate for establishing, and breaking, an electrical connection between the interrogator and the at least one RFID read antenna assembly when the at least one metal substrate is inserted into the holder, and removed from the holder thereby providing access to the article, respectively.

* * * * *